US007381945B2

(12) United States Patent
Cotter et al.

(10) Patent No.: US 7,381,945 B2
(45) Date of Patent: Jun. 3, 2008

(54) NON-LINEAR TIME-OF-FLIGHT MASS SPECTROMETER

(75) Inventors: Robert J Cotter, Baltimore, MD (US); Benjamin D Gardner, Colton, CA (US)

(73) Assignee: The Johns Hopkins Univeristy, Baltimore, MD (US)

( * ) Notice: Subject to any disclaimer, the term of this patent is extended or adjusted under 35 U.S.C. 154(b) by 226 days.

(21) Appl. No.: 10/516,255

(22) PCT Filed: May 30, 2003

(86) PCT No.: PCT/US03/16778

§ 371 (c)(1),
(2), (4) Date: Jun. 27, 2005

(87) PCT Pub. No.: WO03/107387

PCT Pub. Date: Dec. 24, 2003

(65) Prior Publication Data

US 2005/0230613 A1 Oct. 20, 2005

Related U.S. Application Data

(60) Provisional application No. 60/384,343, filed on May 30, 2002.

(51) Int. Cl.
*H01J 49/40* (2006.01)
*H01J 49/26* (2006.01)
*B01D 59/44* (2006.01)

(52) U.S. Cl. ...................... 250/287; 250/281; 250/282; 250/283; 250/286; 250/396 R; 250/397

(58) Field of Classification Search ..................... None
See application file for complete search history.

(56) References Cited

U.S. PATENT DOCUMENTS 5,464,985 A * 11/1995 Cornish et al. ......... 250/396 R
5,814,813 A * 9/1998 Cotter et al. ................ 250/287
5,861,623 A * 1/1999 Park ........................... 250/287

FOREIGN PATENT DOCUMENTS

EP 0456 516 A2 11/1991
WO WO 95/33279 12/1995
WO WO95/33279 * 12/1995

OTHER PUBLICATIONS

Jun Zhang et al., "Simple Geometry Gridless Ion Mirror," J. American Society for Mass Spectrometry, Elsevier Science Inc., No. 11, p. 765-769, ( 2000).

* cited by examiner

*Primary Examiner*—Nikita Wells
(74) *Attorney, Agent, or Firm*—Pillsbury Winthrop Shaw Pittman, LLP

(57) ABSTRACT

A time-of-flight mass spectrometer has a first electrode, a second electrode spaced apart from the first electrode, a third electrode arranged between the first and second electrodes. The third electrode reserves a space for ions to travel between the first and second electrodes. The time-of-flight mass spectrometer further includes a sample probe disposed proximate the first electrode and adapted to hold a sample, and a detector disposed proximate the second electrode. The first electrode is adapted to be connected to a voltage source to cause a difference in voltage between the first and second electrodes to provide an electric field therebetween that changes non-linearly along an ion path between the sample probe and the detector for accelerating ions to be detected.

20 Claims, 7 Drawing Sheets

FIG. 1A
PRIOR ART
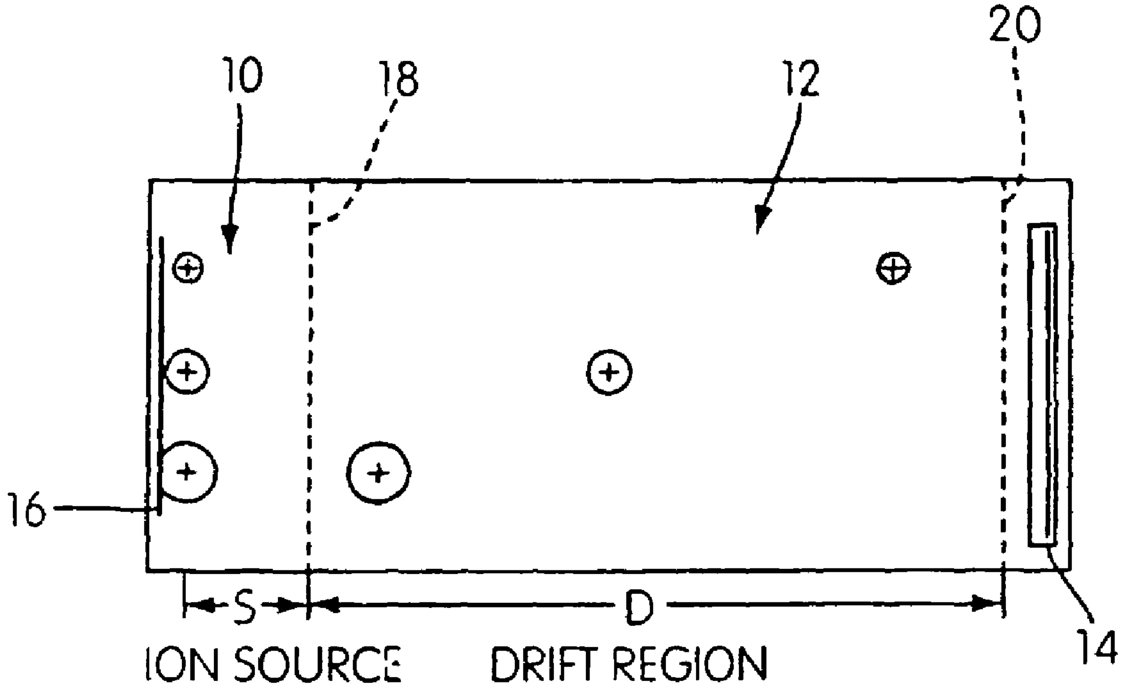
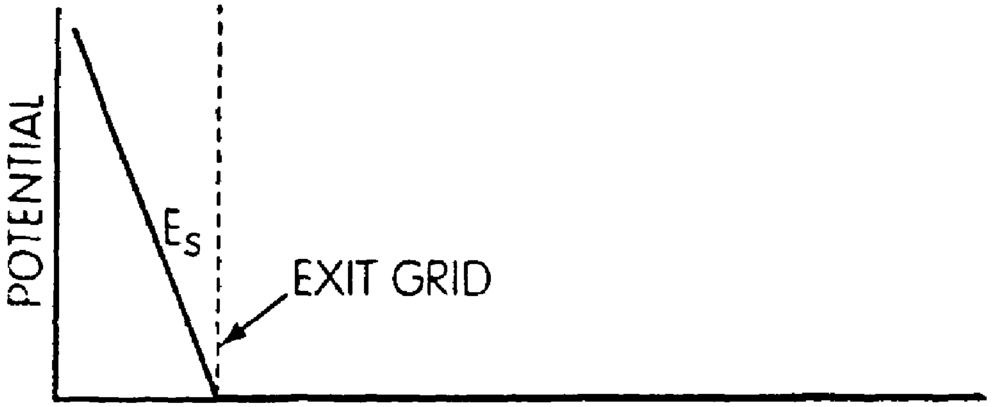
FIG. 1B
PRIOR ART

FIG. 3A
PRIOR ART
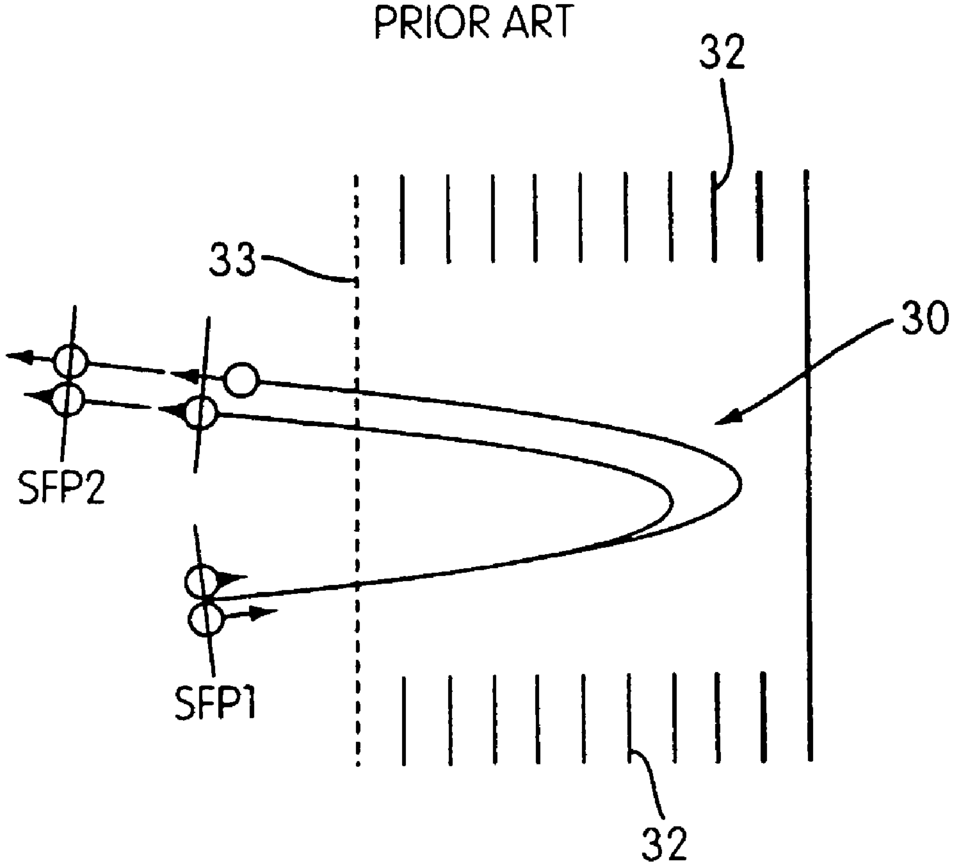
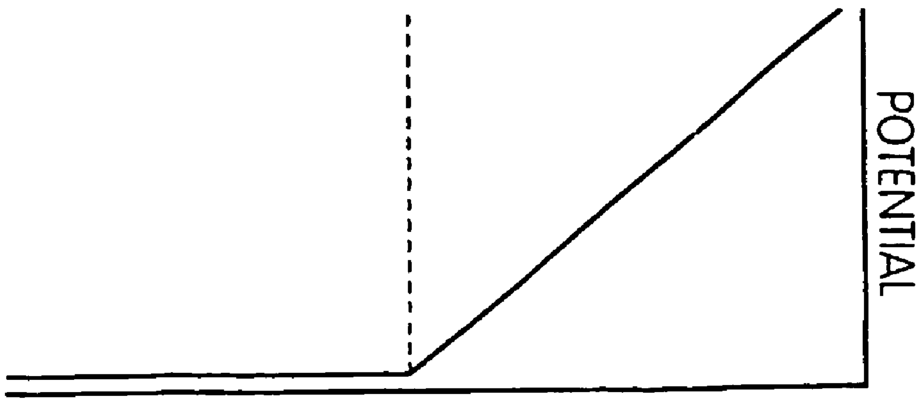
FIG. 3B
PRIOR ART

NON-LINEAR TIME-OF-FLIGHT MASS SPECTROMETER

RELATED APPLICATIONS

This Application is the U.S. National Phase Filing of PCT/US03/16778, filed May 30, 2003, which is based on U.S. Provisional Application No. 60/384,343 filed May 30, 2002, the entire contents of both of which Applications are hereby incorporated by reference.

STATEMENT AS TO RIGHTS TO INVENTIONS MADE UNDER FEDERALLY SPONSORED RESEARCH AND DEVELOPMENT

The present invention was conceived during the course of work supported by grant No. GM64402 from the National Institutes of Health and DARPA grants NBCH1020007 and DABT63-99-1-0006.

BACKGROUND OF THE INVENTION

1. Field of Invention

The present invention relates to a mass spectrometer in general and in particular to a mass spectrometer that employs one or more spatially non-linear fields to accelerate ions from an ion source to a detector.

2. Description of Related Art

Mass spectrometers are instruments that are used to determine the chemical composition of substances and the structures of molecules. In general they consist of an ion source where neutral molecules are ionized, a mass analyzer where ions are separated according to their mass/charge ratio, and a detector. Mass analyzers come in a variety of types, including magnetic field (B) instruments, combined electric and magnetic field or double-focusing instruments (EB or BE), quadrupole electric field (Q) instruments, and time-of-flight (TOF) instruments. In addition, two or more analyzers may be combined in a single instrument to produce tandem (MS/MS) mass spectrometers. These include triple analyzers (EBE), four sector mass spectrometers (EBEB or BEEB), triple quadrupoles (QqQ) and hybrids (such as the EBqQ).

In tandem mass spectrometers, the first mass analyzer is generally used to select a precursor ion from among the ions normally observed in a mass spectrum. Fragmentation is then induced in a region located between the mass analyzers, and the second mass analyzer is used to provide a mass spectrum of the product ions. Tandem mass spectrometers may be utilized for ion structure studies by establishing the relationship between a series of molecular and fragment precursor ions and their products.

Alternatively, they are now commonly used to determine the structures of biological molecules in complex mixtures that are not completely fractionated by chromatographic methods. These may include mixtures of (for example) peptides, glycopeptides or glycolipids. In the case of peptides, fragmentation produces information on the amino acid sequence.

One type of mass spectrometer is time-of-flight (TOF) mass spectrometers. The simplest version of a time-of-flight mass spectrometer, illustrated in FIG. 1A (Cotter, Robert J., Time-of-Flight Mass Spectrometry: Instrumentation and Applications in Biological Research, American Chemical Society, Washington, D.C., 1997), the entire contents of which is hereby incorporated by reference, consists of a short source region 10, a longer field-free drift region 12 and a detector 14. Ions are formed and accelerated to their final kinetic energies in the short source region 10 by an electric field defined by voltages on a backing plate 16 and drawout grid 18. The longer field-free drift region 12 is bounded by drawout grid 18 and an exit grid 20.

In the most common configuration, the drawout grid 18 and exit grid 20 (and therefore the entire drift length) are at ground potential, the voltage on the backing plate 16 is V, and the ions are accelerated in the source region to an energy: $mv^2/2=z\ eV$, where m is the mass of the ion, v is its velocity, z the number of charges, and e is the charge on an electron. The ions then pass through the drift region 12 and their (approximate) flight time(s) is given by the formula:

$$t=[(m/z)/2\ eV]^{1/2}D \quad (I).$$

which shows a square root dependence upon mass. Typically, the length s of source region 10 is of the order of 0.5 cm, while drift lengths (D) ranges from 15 cm to 8 meters. Accelerating voltages (V) can range from a few hundred volts to 30 kV, and flight time are of the order of 5 to 100 microseconds. Generally, the accelerating voltage is selected to be relatively high in order to minimize the effects on mass resolution arising from initial kinetic energies and to enable the detection of large ions. For example, the accelerating voltage of 20 KV (as illustrated, for example, in FIG. 1) has been found to be sufficient for detection of masses in excess of 300 kDaltons.

A profile of the acceleration potential in the source region 10 (shown in FIG. 1A) is shown in FIG. 1B. The potential in this embodiment decreases linearly from a maximum value at the backing plate 16 (shown in FIG. 1A) to zero at the drawout grid 18 (Shown in FIG. 1A).

In recent years, the development of an ionization technique for mass spectrometers known as matrix-assisted laser desorption ionization (MALDI) has generated considerable interest in the use of time-of-flight mass spectrometers and in improvement of their performance. MALDI is particularly effective in ionizing large molecules (e.g. peptides and proteins, carbohydrates, glycolipids, glycoproteins, and oligonucleotides (DNA)) as well as other polymers. The TOF mass spectrometer provides an advantage for MALDI analysis by simultaneously recording ions over a broad mass range, which is the so called multichannel advantage. In the MALDI method of ionization, biomolecules to be analyzed are recrystallized in a solid matrix (e.g., sinnipinic acid, 3-hydroxy picolinic acid, etc.) of a low mass chromophore that is strongly absorbing in the wavelength region of the pulsed laser used to initiate ionization. Following absorption of the laser radiation by the matrix, ionization of the analyte molecules occurs as a result of desorption and subsequent charge exchange processes. In TOF instruments, all ion optical elements and the detector are enclosed within a vacuum chamber to ensure that ions, once formed, reach the detector without collisions with the background gas.

One of the performance criteria for a MALDI-TOF mass spectrometer is the resolving power. The resolving power represents the extent to which ions of different m/z ratios can be distinguished from each other. Ideally, nearly infinite resolving power could be attained if all ions having the same m/z ratio would arrive at the detector simultaneously. However, because MALDI generated ions are formed with a range of initial energies and are extracted from the ion source over a range of starting positions, the ions acquire a range of kinetic energies over a range of times and the resolving power is consequently diminished. Therefore, in order to compensate for these variations in ion starting conditions and in order to attain sufficient resolving power, design features are incorporated in the Time-of-Flight spectrometer.

A number of techniques have been developed to improve the mass resolution of time-of-flight mass spectrometers. The first major improvement to resolving power incorporated two design features that improved both mass resolving power and overall mass range. One of the design features was the development of a two-field ion source (Wiley, W. C., McLaren, I. H., Rev. Sci. Instrumen. 1955, 26, 1150-1157; Wiley, W. C., Science, 1956, 124, 817-820; Wiley, W. C. U.S. Pat. No. 2,685,035). Earlier ion sources used a single electric field for ion extraction that imposed a tradeoff between energy and space focusing. FIG. 2A shows a graph of the voltage potential versus the length $S_0$ between the ion source (backing plate) and the drawout grid or exit grid. The voltage potential decreases linearly to reach zero volt at the exit grid, illustrated in FIG. 2A by a dotted vertical line. The focus position lies at a distance of $2S_0$ from the exit grid. The focus position is indicated on FIG. 2A by a vertical line.

In order to maximize energy resolution, high electric field strength was used to accelerate the ions to their final velocity quickly. However, this required an axially short ion source geometry. In order to achieve a space focus condition the detector is placed also at a short distance ($2S_0$) from the ion source. Hence, the time of flight was not long enough to achieve mass separation. The total time-of-flight could only be increased by either lowering the electric field strength, consequently leading to lowering of the energy resolution, or increasing the length of the flight path by moving the detector well beyond the focus region.

Since the dominant parameter limiting resolving power is the initial energy spread it is determined that lengthening the flight path is the appropriate solution to increasing total flight time to separate masses. Using a two-field ion source, as shown in FIG. 2B, the space focus region could be located farther than $2S_0$ from the ion source at a distance which is a function of the two accelerating field strengths. Thus, while the low amplitude first accelerating field slightly reduced the energy resolution, the ability to achieve both space focusing and an increase in the total flight time for all ions yielded an overall increase in resolving power.

Another early design provided additional focusing by introducing an adjustable time delay between ion formation and application of an acceleration field (Wiley, W. C., McLaren, I. H., Rev. Sci. Instrumen. 1955, 26, 1150-1157; Wiley, W. C., Science, 1956, 124, 817-820; Wiley, W. C. U.S. Pat. No. 2,685,035). During this time, ions move to new locations in the ion source due to their thermal energies and, upon extraction, acquire total kinetic energies dependent on these new location. This energy focusing method, known then as time-lag focusing and now known as pulsed or delayed extraction, essentially attempts to transform the energy distribution of the initial ion population into a spatial distribution, thus reducing the temporal effect of the energy distribution at the space focus position. The combined use of time-lag and space focusing yields a significant increase in resolving power. However, the optimal time lag is mass dependent, limiting the m/z range that could be simultaneously measured.

Another technique for improving the resolving power is the reflectron or ion mirror which provides mass-independent ion focusing (Karataev, V. I., Mamyrin, B. A., Shmikk, D. V. Sov. Phys. Tech. Phys. 1972, 16, 1177.; Mamyrin, B. A., Karataev, V. I.; Shmikk, D. V.; Zagulin, V. A. Sov. Phys. JETP 1973, 37, 45.; Mamyrin, B. A., Shmikk, D. V. Sov. Phys. JETP 1979, 49, 762.; Mamyrin, B. A., Karataev, V. I.; Shmikk, D. V. U.S. Pat. No. 4,072,862). An ion mirror in its basic form is shown in FIG. 3A. Ion mirror 30 comprises simply a series of electrostatic diaphragms 32 that provide a retarding electric field with enough potential to reflect ions. Ions with different kinetic energies penetrate the mirror to different depths before being turned around and repelled from the mirror.

While all ions leave the mirror having exactly the same magnitude of energy with which they entered, those ions possessing the greater energy travel farther into the mirror before being repelled and thus experience a time delay that compensates for their higher velocity in the field-free region. The ions are then focused at a second space-focus position SFP2 where they achieve a higher resolving power than the first space-focus position SFP1 due to the additional energy focusing. As shown in FIG. 3B, the original ion mirror design generates a single, linear electric field behind a field isolating mesh 33 and is capable of first-order focusing. A subsequent design incorporates two fields and is capable of first or second-order focusing.

Mass spectrometers using linear-field focusing devices such as the two-field ion source (shown in FIG. 2B) and the two-field ion mirror generate adequate resolving power for applications having a relatively small initial ion energy distribution. However, for applications having a relatively large initial ion energy distribution, the achievable resolving power is diminished. This is expected since the relationship between energy, velocity and time is fundamentally non-linear, and linear-field devices provide only an approximation of complete temporal focusing. Electrospray ionization (ESI) and MALDI, the two major ionization methods used in biological research, both generate ion populations having a relatively large energy distribution. One approach to compensate for this, used more commonly with ESI, overcomes the current energy focusing limitation by delivering externally-generated ions to the TOF mass analyzer in a direction orthogonal to the analysis axis. Thus, while the overall magnitude of initial ion energy is relatively large, the magnitude along the analysis axis is minimal. For MALDI-TOF, however, the ionization process occurs within the source along the analysis axis. A large initial ion energy distribution is thus inherent to the analysis, presenting a need for improved focusing methods.

The fundamentally non-linear relationship between time and energy in ion motion indicates that the ultimate attainable resolving power can only be achieved using non-linear fields, and the development of focusing methods using such fields is recently building momentum. Several ion mirror designs using a non-linear field have been developed (Glashchenko, V. P.; Semkin, N. D., Sysoev, A. A., Oleinikov, V. A., Tatur, V. Yu. Sov. Phys. Tech. Phys. 1985, 30, 540-541.; Mamyrin, B. A. Int. J. Mass Spectrom. Ion Processes, 1994, 131, 1-19.; Rockwood, A. L. Proc. 34th ASMS Conf. on Mass Spectrom. & Allied Topics, 1986, Cincinnati, Ohio, 173.), while other designs have been proposed and/or patented (Yoshida, Y. U.S. Pat. No. 4,625,112; Frey, R., Schlag, E. W., U.S. Pat. No. 4,731,532; Kutscher, R., Grix, R., Li, G., Wollnik, H., U.S. Pat. No. 5,017,780; Managadze, G. G., Shutyaev, I. Yu. In Laser Ionization Mass Spectrometry, Vertes, A., Gijbels, R., Adams, F., Eds., John Wiley & Sons: New York, 1993, 505-549. Flory, C. A., Taber, R. C., Yefchak, G. E. Int. J. Mass Spectrom. Ion Proc. 1996, 152, 177-184; Doroshenko, V. M., Cotter, R. J. J. Am. Soc. Mass Spectrom., 1999, 10, 992-999; Cotter, R. J., Doroshenko, V. M. U.S. Pat. No. 6,365,892). All of which are incorporated herein in their entirety by reference.

Each of these designs provides only minor improvement to the resolving power achieved using linear-field ion mirrors, and each is suitable to only a relatively narrow initial range of ion energies. Non-linear-field mirrors that focus a broad range of initial ion energies have also been developed using either an entirely gridless design to achieve a single non-linear field (Cornish, T. J., Cotter, R. J. Rapid Comm. Mass Spectrom., 1993, 7, 1037-1040), or a gridded design generating a combination of linear and non-linear fields (Beussman, D. J., Vlasak, P. R., McLane, R. D., Seeterlin, M. A.; Enke, C. G. Anal. Chem. 1995, 67(21), 3952-3957).

While non-linear fields are theoretically preferable to linear fields, one of the drawbacks to generating such fields in ion mirrors is the result of their inherent radial field-inhomogeneity. Linear fields generate an electric potential that is constant in all directions orthogonal to the electric field. Thus, an ion beam entering a linear-field ion mirror at a fixed angle will experience the same force regardless of the entry point. In contrast, an ion beam entering a non-linear field will experience a force that depends on the exact point of entry. An ion beam of finite diameter will thus experience a range of non-linear fields, which reduces the resultant resolving power and radially disperses the ion beam, diminishing the ion transmission. A non-linear design has been developed that exploits the radial dispersion using a single-electrode can-shaped "endcap" ion mirror (Cornish, T. J., Cotter, R. J. Anal. Chem. 1997, 69(22), 4615-4618; Cornish, T. J.; Cotter, R. J. U.S. Pat. No. 5,814,813). A more recent and somewhat more complicated design also uses a minimum number (2 to 3) of electrodes to achieve the desired non-linear field (Zhang, J., Enke, C. G. J. Am. Soc. Mass Spectrom., 2000, 11(9), 759-764; Zhang, J., Gardner, B. D., Enke, C. G. J. Am. Soc. Mass Spectrom., 2000, 11(9), 765-769; Zhang, J., Gardner, B. D., Enke, C. G., Patent Pending).

In contrast to the developments in non-linear ion mirror design, the use of non-linear fields in ion source design is less prevalent. Several designs have been developed, for the analysis of gas-phase ions, where a "quadratic" non-linear ion-accelerating field is generated (Crane, W. S., Mills, A. P. Rev. Sci. Instrum. 1985, 56, 1723.; Hulett, L. D., Donohue, D. L., Lewis, T. A. Rev. Sci. Instrum. 1991, 62, 2131-2137; Rockwood, A. L., Udseth, H. R., Gao, Q.: Smith, R. D. Proc. 42$^{nd}$ ASMS Conf. on Mass Spectrom. & Allied Topics, 1994, Chicago, Ill., 1038). A mass spectrometer based on one of these designs, for the analysis of orthogonally-injected gas-phase ions, is commercially available (LECO Corp., product literature on the Jaguar LC-TOF mass spectrometer).

A separate design incorporating both linear and non-linear fields has been reported (Gardner, B. D., Holland, J. F. J. Am. Soc. Mass Spectrom., 1999, 10(11), 1067-1073), also for the analysis of gas-phase ions. A gridless ion source, which consequently generates a non-linear field by default, is also commercially available on a MALDI-TOF instrument, although the design has not been described (Kratos Analytical AXIMA).

SUMMARY OF THE INVENTION

An aspect of the present invention is to provide a time-of-flight mass spectrometer that includes a first electrode, a second electrode spaced apart from the first electrode, and a third electrode arranged between the first and second electrodes. The third electrode reserves a space for ions to travel between the first and second electrodes. The mass spectrometer further includes a sample probe disposed proximate the first electrode and adapted to hold a sample and a detector disposed proximate the second electrode. The first electrode is adapted to be connected to a voltage source to cause a difference in voltage between the first and second electrodes to provide an electric field therebetween that changes non-linearly along an ion path between the sample probe and the detector for accelerating ions to be detected.

In one embodiment, the first electrode defines a hole therethrough and the sample probe is disposed within the hole. In this embodiment, the first electrode is adapted to provide a beam collimating field in a region of the hole defined therethrough.

The first and second electrodes can be, for example, substantially annular plates, and the third electrode can be, for example, a cylindrical electrode and the detector is disposed in an annulus defined by the second electrode. The first, second and third electrodes, and the detector together provide a mass analyzer that is adapted to provide an electric field that changes non-linearly along substantially the entire paths of ions to be detected.

In one embodiment, the second and third electrodes can be adapted to be provided, for example, with substantially equal electric potentials that are different from electric potentials of the first electrode and said detector during a mode of operation. The second electrode can also be adapted to be provided with, for example, a different electric potential than at least one of said detector and said sample probe.

In another embodiment, the mass spectrometer may further comprise a fourth electrode spaced apart from the second electrode on a side of the second electrode opposite the first electrode, and a fifth electrode disposed between the second electrode and the fourth electrode. The fifth electrode reserves a space for passage of ions to be detected between the second and fourth electrodes and detector defines an aperture to permit passage of ions therethrough. The fourth electrode is adapted to be connected to a voltage source to cause a difference in voltage between the fourth electrode and the second electrode to provide an electric field therebetween that changes non-linearly along an ion path between the detector and the fourth electrode. The fourth electrode can be, for example, a substantially circular plate and the fifth electrode can be, for example, a cylindrical electrode. In this embodiment, the second, fourth and fifth electrodes together form a non-linear ion mirror that deflects ions that pass through the aperture in the detector to return to and be detected by said detector.

In another embodiment, the first, second and third electrodes can have, for example, convex surfaces arranged so that they can be used in an ion trap configuration.

In one embodiment, the mass spectrometer can include a laser arranged to generate ions from a sample when held by the sample probe. In another embodiment the mass spectrometer can further include a source of a time varying electric potential connected to the sample probe to provide a pulsed source electric potential.

Another aspect of the present invention is to provide a method of measuring the mass-to-charge ratio of an ion, the method includes generating an electric field between a sample region and a detector that changes non-linearly with position therebetween, injecting the ion into the electric field to be accelerated to the detector, and detecting the ion and determining a time of flight of the ion. The method may further include generating the ion from a sample by irradiating the sample with a laser. The method may also include generating an electric field to decelerate and then accelerate the ion in a direction reversed from an initial direction prior to said detecting the ion.

BRIEF DESCRIPTION OF THE DRAWINGS

These and other objects and features of the invention will become more apparent and more readily appreciated from the following detailed description of the presently preferred exemplary embodiments of the invention, taken in conjunction with the accompanying drawings, of which:

FIG. 1A is a schematic representation of a conventional time-of-flight spectrometer;

FIG. 1B is a linear electrical potential profile applied in the ion source of a time-of-flight spectrometer of FIG. 1A;

FIG. 3A is a schematic representation of a conventional ion mirror;

FIG. 3B is a retarding electric field applied in the ion mirror shown in FIG. 3A;

DETAILED DESCRIPTION OF SEVERAL EMBODIMENTS OF THE INVENTION

One aspect of the present invention is to provide a mass spectrometer in which substantially the entire flight path of ions uses non-linear electric fields for ion acceleration and temporal focusing.

Figure 2A:
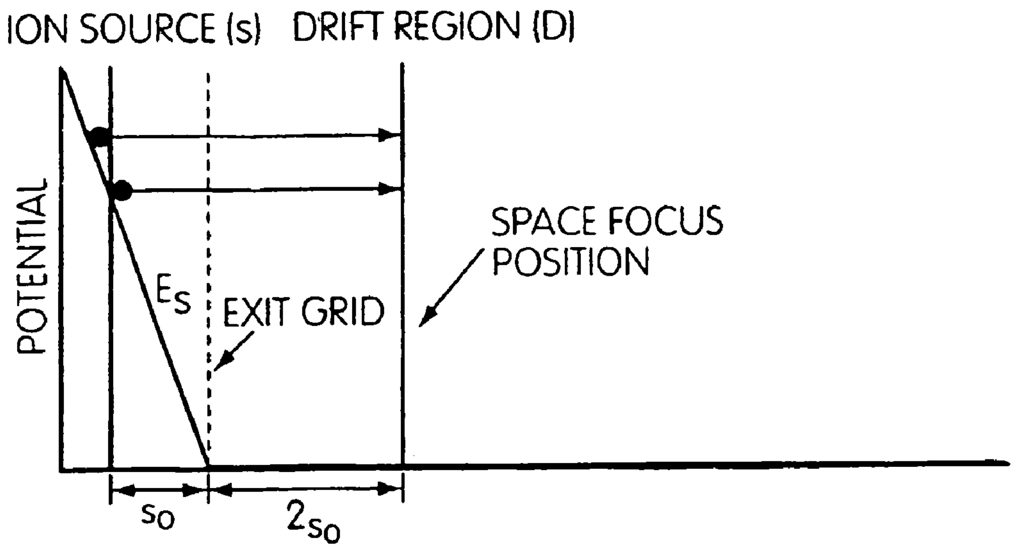
FIG. 2A PRIOR ART
FIG. 2A is a linear electrical potential profile and its relation to the space focus position of the ions.
Figure 2B:
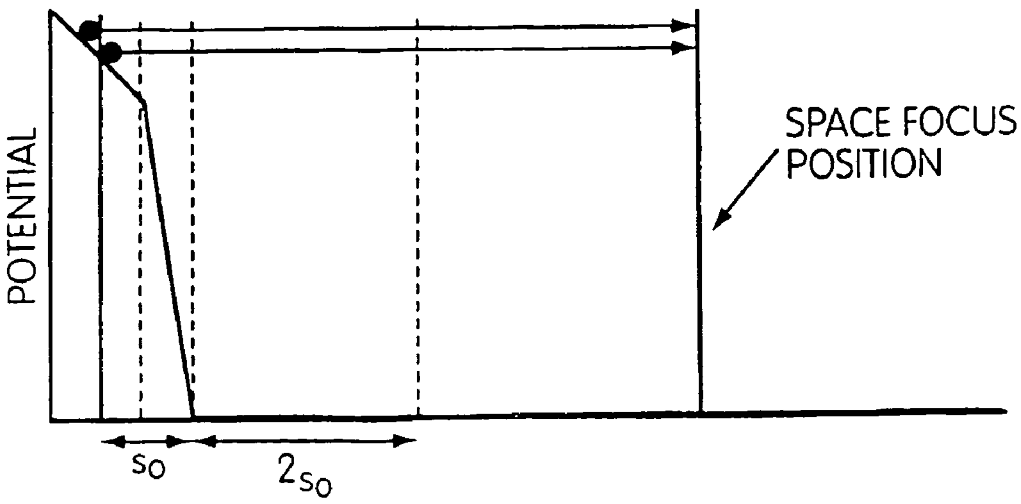
FIG. 2B PRIOR ART
FIG. 2B is a two-field electrical potential profile and its relation with the space focus region.
Figure 4A:
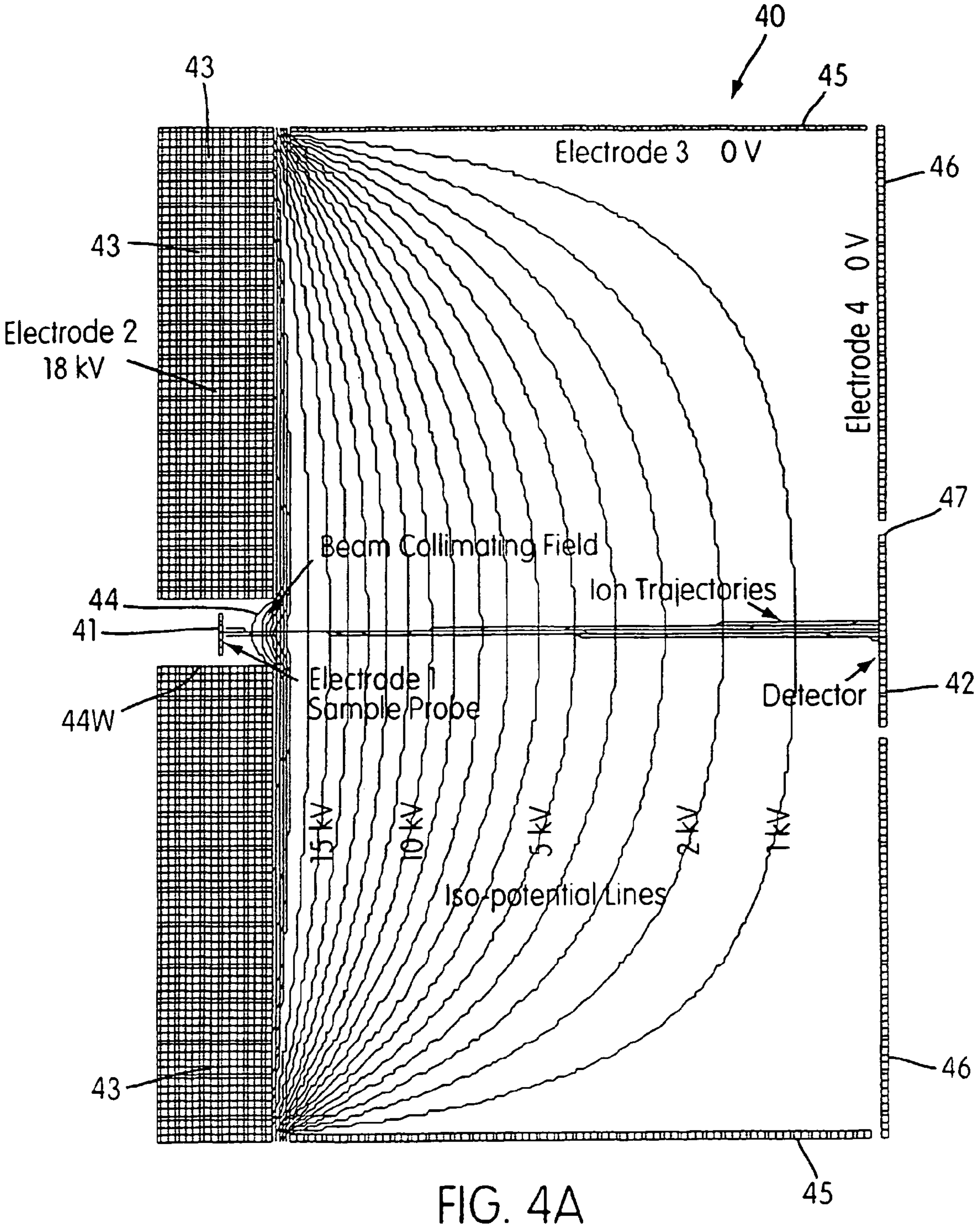
FIG. 4A is a schematic representation of a non-linear time-of-flight mass spectrometer according to an embodiment of the present invention.

One embodiment of a mass spectrometer according to the present invention is shown schematically in FIG. 4A. Mass spectrometer 40 is a time-of-flight spectrometer comprising ion source (sample probe) 41, ion detector 42, and electrode 43 having opening 44 to accommodate ion source 41. The mass spectrometer 40 further comprises electrode 45 arranged substantially perpendicularly to electrode 43 and electrode 46 arranged substantially perpendicularly to electrode 45. The electrode 46 can be arranged substantially parallel to electrode 43 but separated from electrode 43 by a distance substantially equal to at least the length of electrode 45. The electrode 46 has an opening 47 configured to hold ion detector 42.

In one embodiment the electrode 43 has a ring or annular shape with the opening in the middle corresponding to opening 44 and electrode 45 has a cylindrical shape. A diameter of the electrode 45 can be substantially equal to the external diameter of electrode 43. However, one of skill in the art would appreciate that different shapes of the various electrodes are also within the scope of the present invention. For example, the electrode 43 may have a polygonal shape with an opening in its center and the electrode 45 can have an ellipsoid shape (a tube with an elliptical base) or a tube with a polygonal base or other variations.

In this embodiment, the ion source 41 is surrounded by walls 44W of opening 44. For the analysis of positively charged ions, the electrode 43 is held at high potential, for example 18 kV, while the electrode 46 attaching the detector 42 is held at low voltage, for example 0 volt. The cylindrical electrode 45 can be held at any intermediate voltage, with the voltage being selected to optimize the resulting mass resolving power. The ion source sample probe 41 can be held at a potential relatively equal to the potential of electrode 43. Since the electrode 45 is held at a different voltage than the electrode 43, the electrode 45 is electrically decoupled from electrode 43 to allow the onset of a potential difference between the electrode 43 and electrode 45. The electrode 46, on the other hand, can be electrically coupled to electrode 45. For example, as illustrated in FIG. 4A, electrode 45 and electrode 46 are both held at the same potential (0 volt or ground potential).

Figure 4B:
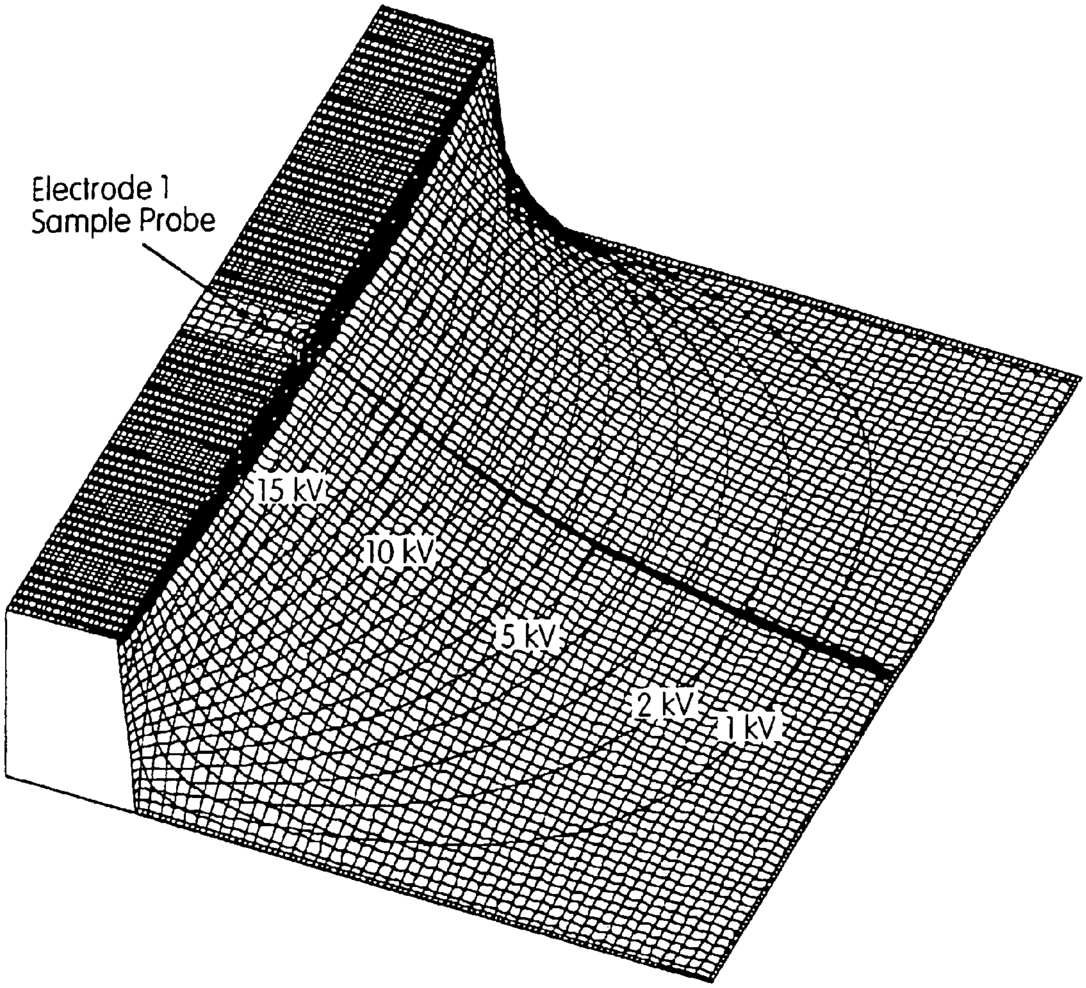
FIG. 4B is a 3-dimensional topographical view of the physical geometry and non-linear electrical field distribution in the mass spectrometer of FIG. 4A.

The electrode 43 being held at a high potential, for example 18 kV and the electrode 46 being held at low voltage, for example 0 volt, allows the onset of a non-linear electrical field between these electrodes, as shown in FIG. 4A with the iso-potential lines of electrical field and in FIG. 4B in the 3-dimensional topographical view of the physical geometry and non-linear electrical field distribution. In particular, a shallow non-linear electric field forms in the source region between the ion source 41 and the exit of opening 44 of electrode 43. This shallow non-linear electric field serves as an ion beam focusing lens that focuses the ions generated at the ion source (sample probe) 41 to a focal point relatively in the vicinity of the exit of opening 44.

The detector 42 can be selected from any commercially available charged particles detector. Such detectors include, but are not limited to, an electron multiplier, a channeltron or a micro-channel plate (MCP) assembly. Although, a micro-channel plate is shown as the detector in FIG. 4A, one skilled in the art would readily understand that using other detectors are also within the scope of the present invention.

An electron multiplier is a discrete dynode with a series of curved plates facing each other but shifted from each such that an ion striking one plate creates secondary electrons and an effect of electron avalanche follows through the series of plates. A channeltron is a horn-like continuous dynode structure that is coated on the inside with an electron emissive material. An ion striking the channeltron creates secondary electrons that have an avalanche effect to create more secondary electrons and finally a current pulse.

A microchannel plate is made of a leaded-glass disc that contains thousands or millions of tiny pores etched into it. The inner surface of each pore is coated to facilitate releasing multiple secondary electrons when struck by an energetic electron or ion. When an energetic particle such as an ion strikes the material near the entrance to a pore and releases an electron, the electron accelerates deeper into the pore striking the wall thereby releasing many secondary electrons and thus creating an avalanche of electrons.

In most applications, two channel plates are assembled to provide an increased gain of electrons. In the embodiment shown in FIG. 4A, a MCP assembly is used as the ion detector 42. The detected electron signal corresponding to an ion striking the detector is further amplified, integrated, digitized and recorded into a memory for later analysis and/or displayed through a graphical interface for evaluation.

For example, in MALDI, the ions are formed by ionizing a sample in the sample probe with a laser. In this instance, the mass spectrometer is provided with a laser which can be pulsed or continuous and the light is directly focused on the sample with either an optical system using lenses, prisms, etc. or directed through an optical fiber to the sample.

The mass spectrometer 40 consists of detecting the arrival of the ions at the detector 42 and measuring their time-of-flight in reference to, for example, firing the laser pulse or the application of a voltage pulse to the sample plate 41. Since, as explained above, the time-of-flight is proportional to the square root of the mass of the ions, knowing the time-of-flight allows the determination of the mass of the ions and thus the identification of the ions.

Upon laser ionization of the sample 41 on the sample surface, the generated ions may be immediately ejected into the main body of the mass analyzer, where the time-dependent mass separation occurs. Alternatively, after a short, definable delay subsequent to laser ionization, a voltage pulse may be applied to the sample electrode to eject the ions into the mass analyzer. The voltage pulse applied to the sample probe or plate 41 may be delayed relative to the laser pulse to increase efficiency of ion extraction. The mass spectrometer can be configured to detect either positively or negatively charged ions.

Figure 5:
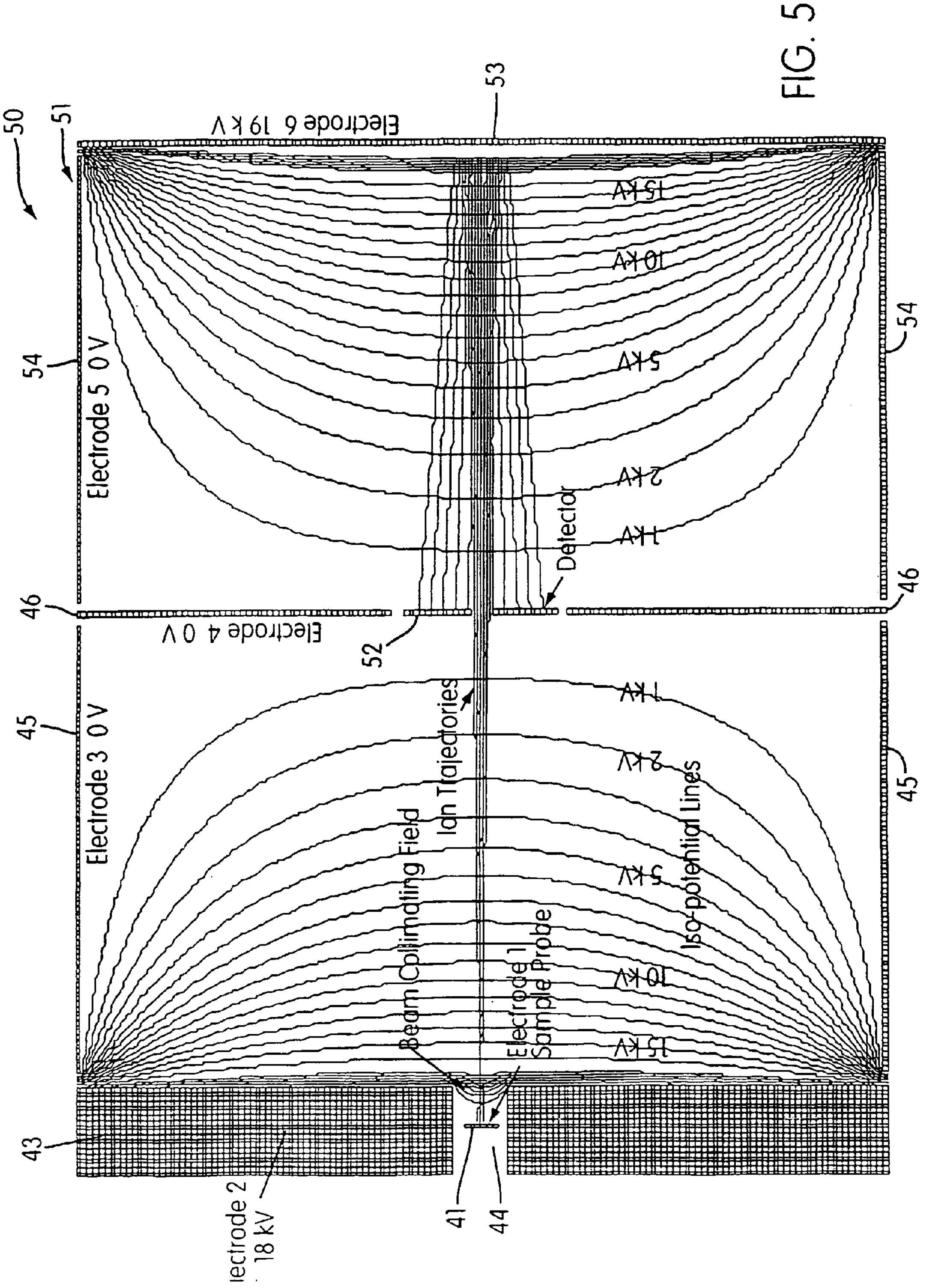
FIG. 5 is a schematic representation of a non-linear time-of-flight mass spectrometer using a non-linear electrical field ion mirror according to another embodiment of the present invention.

In another embodiment shown in FIG. 5, the mass spectrometer 50 comprises the same elements as the mass spectrometer 40 and further comprises ion mirror 51 to provide additional energy focusing to the ions. Specifically, mass spectrometer 50 comprises ion source (sample probe) 41, electrode 43 having opening 44 to accommodate ion source 41, electrode 45 arranged substantially perpendicularly to electrode 43 and electrode 46 arranged substantially perpendicularly to electrode 45. The electrode 46 holds ion detector 52. In this embodiment of the mass spectrometer, the ion detector 52 has a hole or an aperture in its center configured to allow the ions to enter the ion mirror 51.

The ion mirror "endcap" 51 includes electrode 53 and electrode 54. Electrode 53 is held at some high potential enough to reverse the trajectory of the ions. The electrode 53 can be held at a potential slightly greater than the potential of electrode 43 to enable reflection of the ions. For example, if the electrode 43 is held at a potential of 18 kV, the electrode 53 can be held at 19 kV. Similarly to electrode 45, the electrode 54 can be held to some lower potential. For example, electrode 54 can be held at a potential of 0 volt.

Due to the difference of potential existing between electrode 53 and electrode 46 and due to the difference of potential existing between the electrode 53 and electrode 54 a non-linear electrical field is established, thus allowing further energy focusing in addition to reflecting the ions back into ion detector 52 as illustrated on FIG. 5.

Although the mass spectrometer 50 is described using specifically ion mirror 51, the mass spectrometer 50 can also perform temporal focusing by using, for example, the ion mirror 30 described above and shown in FIG. 3A. Similarly the mass spectrometer 50 can perform temporal focusing by using ion mirror 51 coupled with a conventional ion mass analyzer such as the mass analyzer shown in FIG. 1A and described above.

Figure 6:
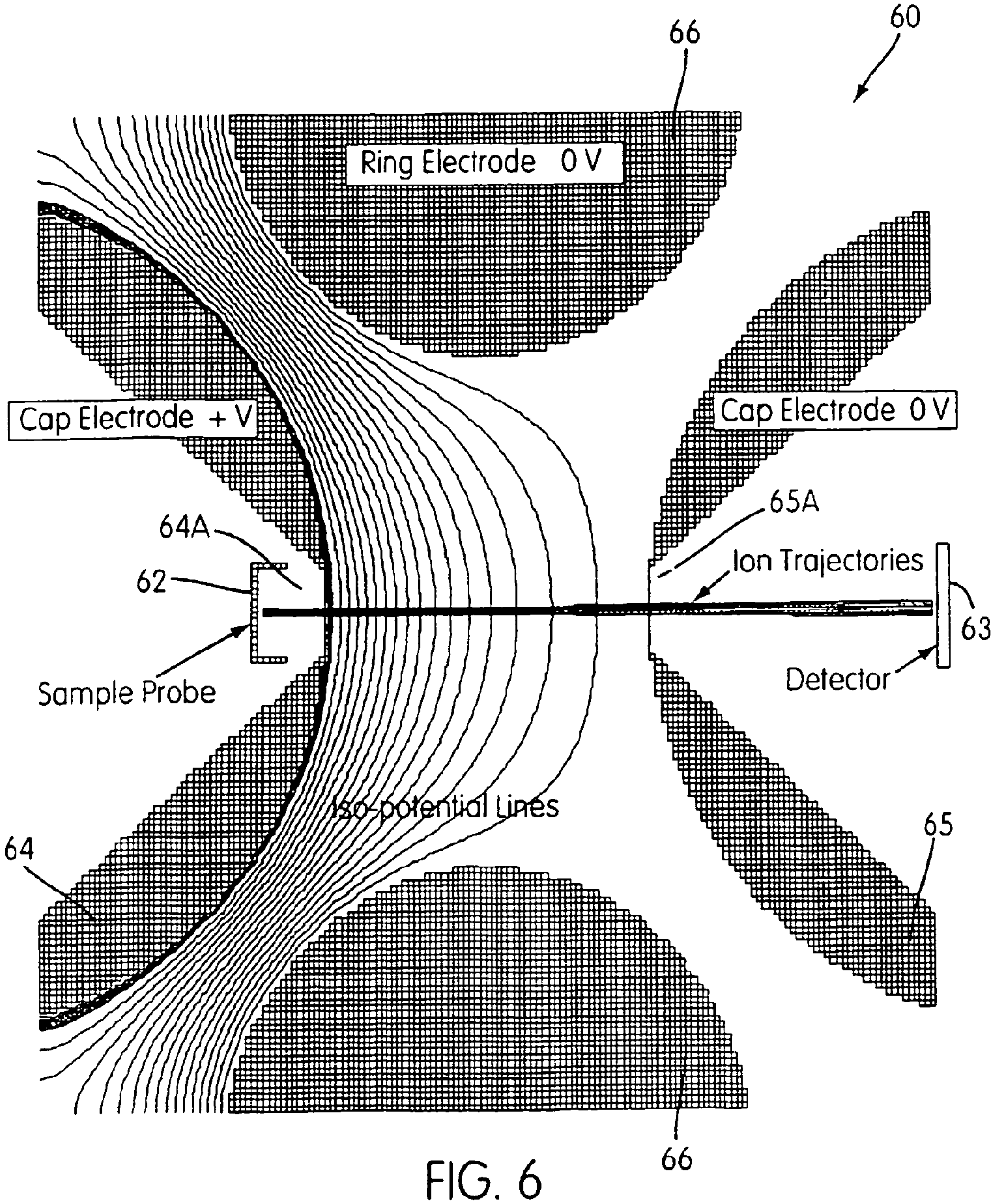
FIG. 6 is a schematic representation of a non-linear time-of-flight mass spectrometer using a non-linear electrical field in an ion trap geometry.

In another embodiment shown in FIG. 6, the time-of-flight mass spectrometer 60 comprises ion source sample probe 62, ion detector 63, a first end cap electrode 64 arranged proximate to ion source 62, and a second end cap electrode 65 arranged proximate detector 63. The mass spectrometer 60 further comprises a ring electrode 66 arranged between the first end cap electrode 64 and the second end cap electrode 65. The first end cap electrode 64 and second end cap electrode 65 have, respectively, openings 64A and 65A for allowing the ions to travel from the sample probe 62 to the ion detector 63.

The ring electrode 66 may be connected to either a radio-frequency voltage source and the mass spectrometer operates in ion trap mode or to a constant voltage and the mass spectrometer operates in time-of-flight mode. In the same fashion, the first end cap electrode 64 and second end cap electrode 65 may be selectively connected to either a supplemental radio-frequency voltage source when the mass spectrometer operates in ion trap mode or to constant voltage source when the spectrometer operates in time-of-flight mode. A detailed description of operation of the mass spectrometer is given in a co-pending application entitled "Combined Chemical/Biological Agent Mass Spectrometer Detector," Ser. No. 10/508,333, the entire contents of which are herein incorporated by reference.

In this instance, the mass spectrometer is operated in time-of flight mode and in this mode of operation, first end cap electrode 64 is connected to a voltage potential. Whereas, second end cap electrode 65 is maintained at a constant voltage substantially equal to the constant voltage applied to ring electrode 66. In this way, a non-linear electrical field is generated between the first end cap electrode 64 and the ring electrode 66 and between the first end cap electrode 64 and second end cap electrode 65.

Therefore, similarly to time-of-flight mass spectrometer 40, due to the presence of the non-linear electrical field, energy focusing occurs in the ion beam.

Although the mass spectrometer of the present invention is shown in various specific embodiments, one of ordinary skill in the art would appreciate that variations to these embodiments can be made therein without departing from the spirit and scope of the present invention. For example, although the mass spectrometer has been described with the use of a laser as an ionizing source, one of ordinary skill in the art would appreciate that using electron ionization, electrospray, atmospheric pressure ionization (API) and atmospheric MALDI (APMALDI) is also within the scope of the present invention. The many features and advantages of the present invention are apparent from the detailed exemplary embodiments and the scope is determined by the appended claims.

Furthermore, since numerous modifications and changes will readily occur to those of skill in the art, it is not desired to limit the invention to the exact construction and operation described herein. Moreover, the process and apparatus of the present invention, like related apparatus and processes used in mass spectrometry arts tend to be complex in nature and are often best practiced by empirically determining the appropriate values of the operating parameters or by conducting computer simulations to arrive at a best design for a given application. Accordingly, all suitable modifications and equivalents should be considered as falling within the spirit and scope of the invention.

We claim:

1. A time-of-flight mass spectrometer, comprising:

a first electrode having a substantially annular shape;

a second electrode having a substantially annular shape and being positioned parallel to and spaced apart from said first electrode;

a third electrode having a substantially cylindrical shape and orthogonally positioned between said first and second electrodes at one end of said first and second electrodes in order to define a single region for ions to travel between said first and second electrodes;

a sample probe disposed proximate to said first electrode and adapted to hold a sample; and a detector disposed proximate to said second electrode, wherein said first electrode is adapted to be connected to a voltage source for accelerating ions to be detected, the voltage source causing a difference in voltage between said first and second electrodes to provide an electric field that changes non-linearly along substantially entire paths of ions within the single region between said sample probe and said detector.

2. A time-of-flight mass spectrometer according to claim 1, wherein said first electrode defines a hole therethrough, said sample probe being disposed within said hole, wherein said first electrode is adapted to provide a beam collimating field in a region of said hole defined therethrough.

3. A time-of-flight mass spectrometer according to claim 2, wherein said detector is disposed in an annulus defined by said second electrode.

4. A time-of-flight mass spectrometer according to claim 3, wherein said first, second and third electrodes, and said detector together provide a mass analyzer.

5. A time-of-flight mass spectrometer according to claim 3, further comprising:

a fourth electrode spaced apart from said second electrode on a side of said second electrode opposite said first electrode; and a fifth electrode disposed between said second electrode and said fourth electrode and reserving a space for passage of ions to be detected between said second and fourth electrodes, wherein said detector defines an aperture to permit passage of ions therethrough, and wherein said fourth electrode is adapted to be connected to a voltage source to cause a difference in voltage between said fourth electrode and said second electrode to provide an electric field therebetween that changes non-linearly along an ion path between said detector and said fourth electrode.

6. A time-of-flight mass spectrometer according to claim 5, wherein said fourth electrode is substantially a circular plate and said fifth electrode is a cylindrical electrode.

7. A time-of-flight mass spectrometer according to claim 5, wherein said second, fourth and fifth electrodes together form a non-linear ion mirror that deflects ions that pass through said aperture in said detector to return to and be detected by said detector.

8. A time-of-flight mass spectrometer according to claim 2, wherein said first, second and third electrodes have convex surfaces arranged so that they can be used in an alternative ion trap configuration.

9. A time-of-flight mass spectrometer according to claim 3, wherein said second and third electrodes and said detector are adapted to be provided with substantially equal electric potentials that are different from electric potentials of said first electrode and said sample probe during a mode of operation.

10. A time-of-flight mass spectrometer according to claim 2, wherein said sample probe has an electrical potential different from the first electrode.

11. A time-of-flight mass spectrometer according to claim 3, wherein said second electrode is adapted to be provided with a different electric potential than at least one of said detector and said sample probe.

12. A time-of-flight mass spectrometer according to claim 1, further comprising a laser arranged to generate ions from a sample when held by said sample probe.

13. A time-of-flight mass spectrometer according to claim 1, wherein an electric field proximate said sample probe changes non-linearly along an ion path to said detector.

14. A time-of-flight mass spectrometer according to claim 1, further comprising a source of a time varying electric potential connected to said sample probe to provide a pulsed source electric potential.

15. A time-of-flight mass spectrometer according to claim 1, wherein said second and third electrodes are connected to form a single electrode.

16. A method of measuring the mass-to-charge ratio of an ion comprising:

arranging a first electrode and a second electrode in parallel and orthogonally positioning a third electrode having a substantially cylindrical shape at one end of said first and second electrodes in order to define a single region;

positioning sample probe proximate to said first electrode;

positioning a detector proximate to said second electrode;

generating an electric field in the single region between the sample probe and the detector that changes non-linearly along substantially an entire path of the ion;

injecting said ion into said electric field to be accelerated to said detector; and detecting said ion and determining a time of flight of said ion.

17. A method of measuring the mass-to-charge ratio of an ion according to claim 16, further comprising generating said ion from a sample by irradiating said sample with a laser.

18. A method of measuring the mass-to-charge ratio of an ion according to claim 16, further comprising generating said ion from a sample by applying a pulsed electric potential to said sample.

19. A method of measuring the mass-to-charge ratio of an ion according to claim 16, further comprising: generating an electric field to decelerate and then accelerate said ion in a direction reversed from an initial direction prior to said detecting said ion.

20. A method of measuring the mass-to-charge ratio of an ion according to claim 19, wherein said electric field generated to decelerate and then accelerate said ion changes non-linearly along a path of said ion.

* * * * *